Dec. 20, 1966  W. P. CRAWLEY  3,292,991
PROCESS OF FIRE-PROOFING A BLEND OF CERAMIC FIBERS AND ACRYLIC
RESIN FIBERS BY HEATING IN AN OXIDIZING ATMOSPHERE
Original Filed Oct. 24, 1957  2 Sheets-Sheet 1

INVENTOR.
WILLIAM P. CRAWLEY

BY

ATTORNEY

INVENTOR.
WILLIAM P. CRAWLEY
BY
ATTORNEY even# United States Patent Office 3,292,991
Patented Dec. 20, 1966

3,292,991
PROCESS OF FIRE-PROOFING A BLEND OF CERAMIC FIBERS AND ACRYLIC RESIN FIBERS BY HEATING IN AN OXIDIZING ATMOSPHERE
William P. Crawley, Gastonia, N.C., assignor to The Carborundum Company, Niagara Falls, N.Y., a corporation of Delaware
Original application Oct. 24, 1957, Ser. No. 692,206, now Patent No. 3,125,404, dated Mar. 17, 1964. Divided and this application May 14, 1963, Ser. No. 280,261
5 Claims. (Cl. 8—115.7)

The present application is a division of copending application Serial Number 692,206, filed October 24, 1957, now U.S. Patent 3,125,404.

This invention relates to an improved fireproof, heat resistant, pliable cloth that has satisfactory strength and that may be woven, felted, or knitted.

The acrylic fibers have outstanding resistance to temperatures up to about 150° C. (302° F.) for periods up to twenty hours. However, when acrylic fiber is heated in air above about 160° C. (320° F.) an exothermic reaction takes place. When combustion is prevented, the polyacrylonitrile, which forms the basis for the acrylic fibers, is transformed to a heterocyclic form, while retaining a linear polymeric structure. This heat-treated acrylic fiber exhibits superior resistance to degradation on short-time exposures to high temperatures. Even in a flame, very little combustion takes place, although at temperatures as high as 900° C. (1652° F.) the heat-treated fibers are gradually consumed.

Heat-treated acrylic fiber has considerable promise in many applications where ordinary acrylic fiber cannot be used, such as, for example, fire-proof clothing, pipe lagging, and for filtration fabrics.

Unfortunately, however, acrylic staple fiber and articles made therefrom generally can be heat-treated successfully only on a laboratory scale. Close control over temperature is practically impossible to achieve because the reaction is exothermic, and the rise in temperature that accompanies the reaction is usually sudden and dramatic. Attempts to heat-treat acrylic staple fiber on a large scale have produced disastrous results, in which the entire batch of fabric being treated was burned, sometimes explosively. Attempts to control the combustion by performing the heat treating in a closed chamber, in an inert atmosphere, have been frustrated because oxygen or an oxidizing atmosphere is essential to the reaction. For the foregoing reasons, heat-treated acrylic fiber fabrics are not available at the present time, despite the fireproof nature of the fiber, and its great promise in many applications.

Inorganic fibers, such as, for example, aluminum silicate ceramic fiber, are resistant to high temperatures, but do not readily form yarns and cloths. These ceramic fibers, which contain a major proportion of aluminum silicate, together with small amounts of boric oxide, zirconia, or other fluxes are brittle and delicate, so that a carrier fiber must be used with the ceramic fiber, in order to process ceramic fiber yarn on conventional textile machinery. Otherwise, during carding and forming a web from which roving and then yarn is made, the ceramic fibers break up into small pieces and very short lengths which cannot be converted into a web. Cellulosic fibers, such as cotton and rayon, are good carrier fibers, but these fibers burn out or decompose at temperatures in excess of 400° F., and the residual strength is very low as a result of the loss of the carrier fiber.

I have found that when a fabric is constructed of a blend of inorganic, heat resistant fiber, and acrylic fiber, and is thereafter heat-treated to convert the acrylic fiber to fire-proof form, the resultant fabric has improved and unexpected properties, in that it is heat resistant, fireproof, and abrasion resistant, and has good strength and a pleasant hand. Moreover, the fabric shrinkage during heat treatment is moderate, usually about 3%, a highly desirable and unexpected attribute, since the acrylic fiber alone has a shrinkage of 40%–45% when heat treated.

Accordingly, one object of the present invention is to provide a combination of acrylic fiber and inorganic heat-resistant fiber, in an intimate blend that can be carded, spun, and woven, and that can be formed into non-woven papers, blankets, and fabrics, and that can be heat treated to provide a heat-resistant material that has superior strength characteristics.

Another object of the invention is to provide heat-resistant material that is suitable for many high temperature applications, where moderate strength and good thermal insulating characteristics are desired.

A related object of the invention is to provide a fireproof cloth that is characterized by good heat resistance and good strength, even at, and after exposure to, temperatures above 500° F.

Another object of the invention is to provide a process for the production on conventional textile machinery of cloths that are resistant to high temperatures, and that contain substantial proportions of inorganic fiber.

A further object of the invention is to provide a commercially feasible process for the production of useful cloth from heat-treated acrylic fiber.

According to the present invention, an intimate blend of fibers is made of from about 15% up to about 85% or even about 90% by weight of inorganic, heat-resistant fiber, and an acrylic fiber comprising polyacrylonitrile or copolymers thereof that contain a major proportion, usually 85% by weight or more, of polyacrylonitrile. The acrylic fiber functions as a carrier fiber for the inorganic fiber and permits it to be worked on textile machinery. The fiber blend can be carded, spun, and woven to form woven cloth and can be formed into felted paper, blanket or cloth. The cloth can also be subjected to a heat treatment in the range between about 400° F. up to about 600° F., in a circulating, oxidizing atmosphere to produce a fireproof cloth. The heat treatment converts the acrylic fiber to an apparently new chemical form, in which, however, it retains its physical form and from about 40% to about 50% of its strength. The inorganic fiber absorbs and distributes the heat and thereby facilitates the heat treatment and makes it practical on a commercial scale.

The heat-treated acrylic fiber serves as a binder for the inorganic fiber, and imparts superior strength to the material. The inorganic fiber imparts heat resistance and good thermal insulating characteristics to the material.

The invention can best be understood by reference to the following detailed description of several examples of specific embodiments thereof, with reference to the accompanying drawings.

The drawings show graphically certain physical characteristics of cloth made according to one embodiment of the invention that is described in Example 2 hereafter. In the drawings.

EXAMPLE 1

Figure 1:
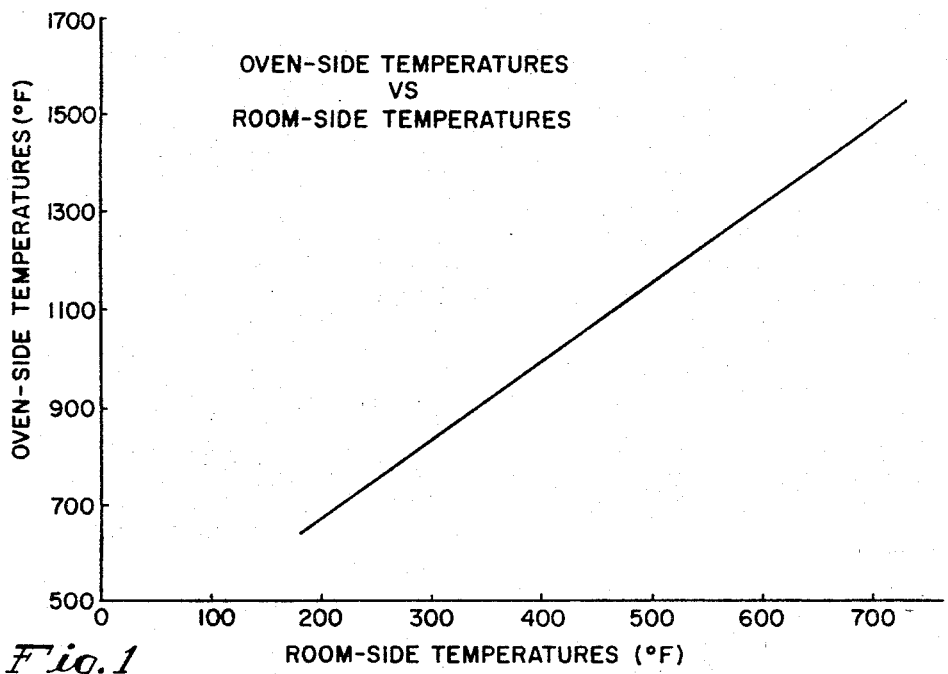
FIG. 1 is a curve showing the temperature drop through the cloth formed according to one embodiment of the invention as described in Example 2, the curve being obtained by plotting the temperatures on the cool side of the cloth (abscissa) against temperatures on the hot side of the cloth (ordinate)

*Heat-resistant cloth woven from an intimate blend of ceramic fiber and acrylic fiber*

An intimate blend was made from 70 parts by weight of aluminum silicate ceramic fiber and 30 parts by weight of acrylic fiber.

The ceramic fiber was long staple "Fiberfrax" aluminum silicate fiber that had a mean diameter of about 4 microns. "Fiberfrax" is a registered trademark of The Carborundum Company, Niagara Falls, New York. The carrier fiber was "Dynel" fiber. "Dynel" is a registered trademark of Union Carbide Corporation, New York, New York, for its acrylic fiber that is made from a copolymer of acrylonitrile and vinyl chloride. A 3 denier, 1½" staple acrylic fiber was used.

The blend was made by hand picking the component fibers and making a sandwich-type mix. The mix was then broken down vertically and re-sandwiched. This was repeated for a total of three blendings. The stock was then hand fed to a single cylinder card equipped with ring doffers and rub aprons. A good fiber blend was obtained. The blend was processed into yarn on a woolen spinning frame. The resulting yarns were satisfactory. Drafts as high as 1.25 were used successfully in spinning the yarn.

This yarn had good strength and unusual heat resistance. It can be woven to form insulating cloths, filter elements, gaskets and packings, of unusual heat resistance. The yarn demonstrates good characteristics possessed by neither fiber alone, and it retains some strength even after the acrylic fiber has been burned off by an open flame.

EXAMPLE 2

*Heat-treated heat-resistant cloth*

An intimate fiber blend was prepared that contained 80 parts by weight of "Fiberfrax" aluminum silicate ceramic long staple fiber, and 20 parts by weight of "Orlon" acrylic staple fiber. "Orlon" is a registered trademark of E. I. du Pont de Nemours and Company, Wilmington, Delaware.

The ceramic fiber had a mean diameter of about 4 microns, and fiber diameters that were predominantly in the range between about 4 and about 8 microns, with a minimum of about 2 microns and a maximum of about 40 microns.

The acrylic fiber was a 2 denier fiber whose fiber length was about 2½ inches. The acrylic polymer of the fiber comprised primarily polyacrylonitrile.

The ceramic fiber and acrylic fiber were intimately blended according to the process described in the copending patent application of John W. Weber, Serial No. 658,582, filed May 13, 1957 and now U.S. Patent No. 3,012,289. First the acrylic carrier fibers were carded to form a continuous web. This web was divided into four widths. A mass of the ceramic fibers was opened to make a plurality of small tufts, and the tufts were deposited onto each of the widths of the web of carrier fibers, so that there were a plurality of tufts of ceramic fibers distributed upon each width of the carrier web. The widths of the carrier web, with the ceramic fiber tufts thereon, were then superposed to form a pile of layers, and this pile was then carded to form a web of blended acrylic and ceramic fibers.

The blended web was spun to form yarn. The yarn was woven into a fabric, to which the following construction information relates:

| | |
|---|---|
| Yards per lb., 2-ply warp and filling | 460. |
| Twist, warp and filling: | |
| Singles | 6.6 Z. |
| Ply | 5.0 S. |
| Loom construction | 12 x 12. |
| Reed | 6/2. |
| Total ends in warp | 512. |
| Width in reed | 42.66". |
| Width, finished | 39". |
| Fabric weight, finished | 32 oz./sq. yd. |

Tensile tests on the finished fabric indicated an average of about 28 lbs. for warp and for filling directions.

This fabric was then passed through an open-air oven, in which air circulated freely about the fabric. The fabric was heated by direct radiation from banks of far-infrared radiant heaters that were mounted above and below the fabric, to heat its upper and lower surfaces. The fabric was passed through the oven slowly and was maintained at a substantially uniform temperature of about 482° F. to 484° F. for a period of 3 hours. During the heat treatment, the initially white fabric darkened to a substantially uniform, pepper and salt medium gray appearance. Microscopic examination indicated that the heat-treated acrylic fibers had turned jet black, and that the ceramic fiber was unchanged in color.

A rough test was made of the temperature resistance of the fabric by heating one side of the fabric with a propane torch for several minutes. Temperature readings on each side of the fabric indicated a very substantial drop in temperature from one side of the fabric to the other. When the thermocouple on the hot side of the fabric indicated a temperature of about 1850° F., a thermocouple reading on the other side of the fabric indicated a temperature below 600° F. This is a significant drop in temperature considering the weight and thickness of the cloth.

The shrinkage observed after heat treatment of the fabric represented a total loss in area of only about 3%. This is superior to the large area shrinkage, on the order of 40% to 45%, that must be allowed when acrylic fiber fabrics are heat-treated on a laboratory scale.

A large piece of this fabric, about two feet square, was then mounted in a vertical position across the door of an oven. Thermocouples were mounted on the inner face or oven side of the fabric, and on the outer face or room side of the fabric. As the temperature of the oven was raised gradually, from about 500° F. to 1500° F., temperature readings were taken on both thermocouples, approximately simultaneously. The results were recorded and are represented graphically in FIG. 1. As shown, when the oven side temperature was on the order of 700° F., the room side temperature was only slightly over 200° F. When the oven side temperature was about 1400° F., the room side temperature was under 700° F. This demonstrated in a dramatic manner the excellent insulating characteristics of the fabric, which had a thickness of only approximately ⅛ of an inch.

Figure 2:
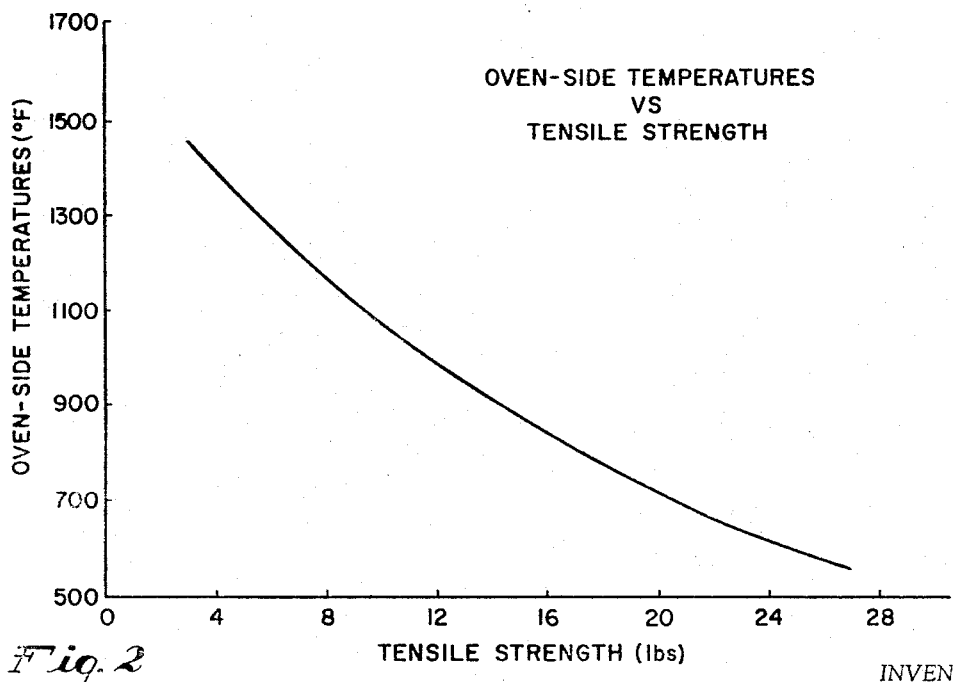
FIG. 2 is a curve showing the tensile strength of the cloth after exposure for twenty-four hours to elevated temperature.

Pieces of the fabric were then tested individually to determine the effect of high temperatures on the tensile strength of the fabric. The pieces were each held in an oven for 24 hours, at different temperatures, and then were broken to determine their tensile strength. Results of these tests were recorded and were plotted, and a curve was drawn, shown in FIG. 2. The temperatures to which the pieces were heated in the oven were determined by thermocouples that were mounted on the oven side of the pieces.

Figure 3:
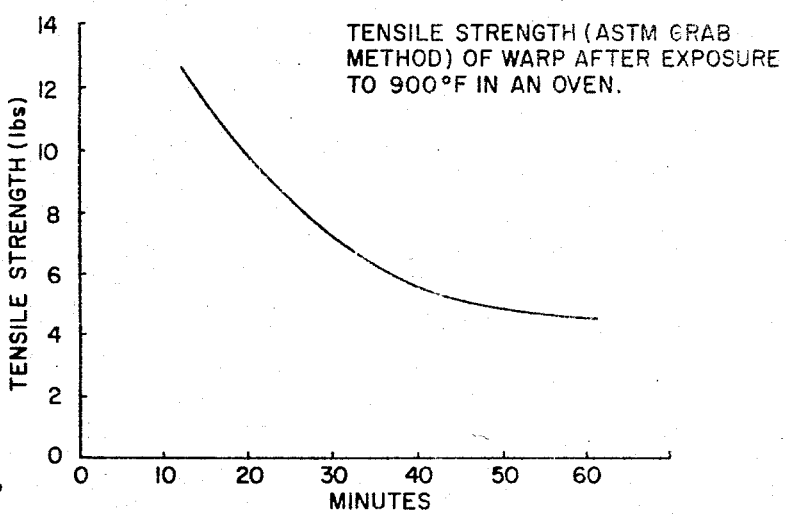
FIG. 3 is a curve showing the tensile strength of the warp after exposure for different periods of time to a temperature of 900° F. in an oven.

Several pieces of the fabric were then placed in an oven that was at 900° F. At intervals, the pieces were removed, one by one, and were tested to determine tensile strength. The results were plotted and the curve drawn is shown in FIG. 3.

Figure 4:
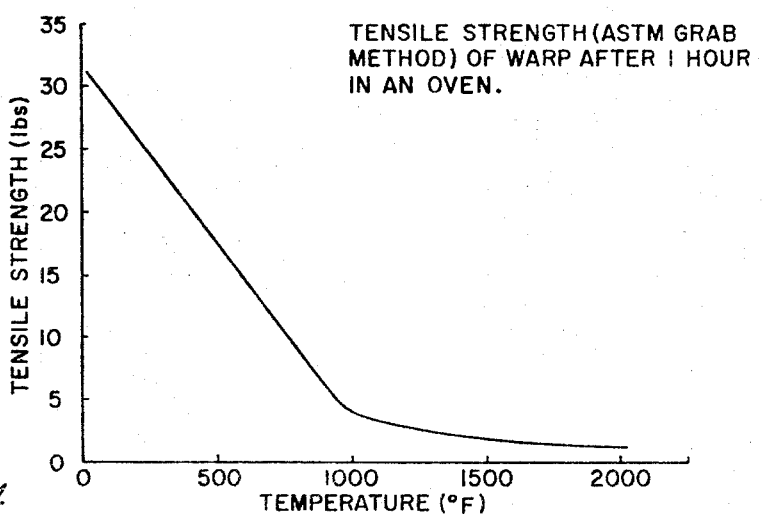
FIG. 4 is a curve showing the tensile strength of the warp after one hour in an oven at different temperatures.
Figure 5:
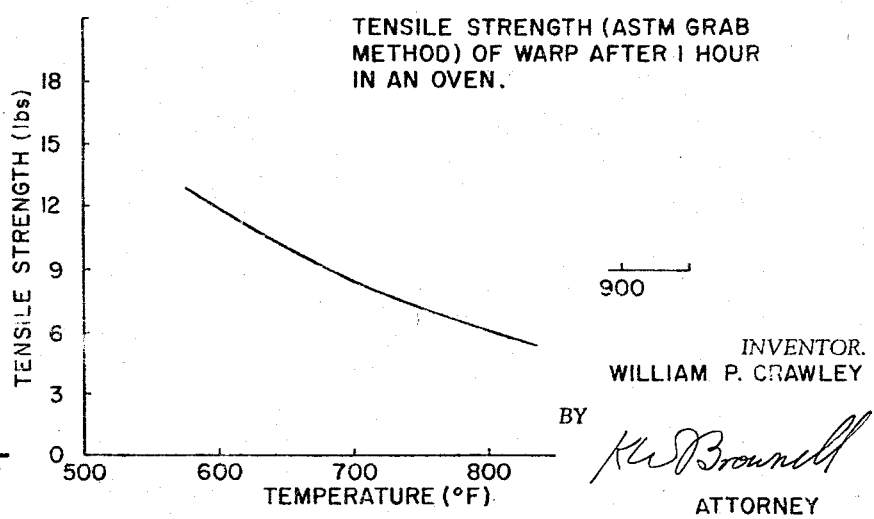
FIG. 5 is a portion thereof on an enlarged scale.

The tensile strength of the fabric was also determined after exposure to different temperatures from room temperature to 2000° F., for periods of one hour. These results were plotted, and the curve drawn is shown in FIG. 4. In the range 575° F. to 800° F., which is particularly interesting for some applications, several determinations were made at closely spaced temperatures. These results were plotted, and the curve drawn is shown in FIG. 5.

Following the procedure generally described above, other fabrics were made from fiber blends that contained acrylic fiber and from about 15% up to about 85% by weight of "Fiberfrax" aluminum silicate ceramic fiber. These fabrics were heat treated to convert the acrylic fiber to heat stable, non-flammable form. All of these heat-treated fabrics exhibited good thermal stability and excellent heat-insulating characteristics. Fabric strength was good. In general, however, for optimum fabric characteristics, and for ease in processing, an aluminum silicate ceramic fiber content, in the fiber blend, of about 80% to 85% is preferred. However, fabrics that contained 60% of the ceramic fiber, and the balance heat treated acrylic fiber, had good heat resistance and good strength at high temperatures. Excellent strength characteristics, with somewhat lower heat resistance, were observed in heat-treated fabrics that had "Fiberfrax" ceramic fiber contents in the range between about 45% and 48% by weight.

These fabrics had excellent characteristics for use as heat barriers, of many types, for example, for furnace curtains, lagging, and sleeves.

To provide another demonstration of this embodiment of the invention, a needled felt can be made from 60 parts by weight of "Fiberfrax" ceramic fiber and 40 parts by weight of "Orlon" acrylic fiber. After heat treatment, the felt is an excellent filter element for use in a reverse flow jet filter device, operating at temperatures on the order of about 600° F., and lower.

Another fabric was prepared, according to this embodiment of the invention, from 80 parts by weight "Fiberfrax" ceramic fiber and 20 parts by weight "Orlon" acrylic staple fiber, in a herringbone weave, 32 ozs./sq. yd. After heat treatment, the warp breaking strength, ASTM Grab, was 27.2 lbs. After 24 hours at 1000° F. and at 1500° F., respectively, the breaking strength, ASTM Grab, was 6.7 lbs. and 5.3 lbs. Tests indicated that when heat was applied only to one side of the cloth, and/or the duration of the exposure time was short, considerably higher tensile readings are obtained at these temperatures. A thermal drop test was also performed by impinging, on one side of a piece of the fabric, the flame from a propane torch. The temperatures on both sides of the fabric were measured simultaneously. Although the fabric thickness was only 0.135", the temperature drop was 995° F. when the flame side temperature reading was 1963° F. A twill weave tape of the same fiber composition was also made up. It had a width of 6", a thickness of 0.134", and a thread count of 15 x 11, and had a weight of 34.5 ozs./sq. yd. This tape had comparable properties and was particularly adapted for insulating applications where a tape form was required.

EXAMPLE 3

*Asbestos fiber-acrylic fiber blends*

Following the procedure described in detail in Example 2, an intimate blend can be made of long staple asbestos fiber, Cassiar grade AAA, a chrysotile asbestos, and "Orlon" acrylic staple fiber, and the web can be formed into a woven fabric. The fabric can be heat treated in an open air oven, at a temperature of about 482° F., for a period of three hours, by a continuous process.

The heat-treated fabric has good strength characteristics and excellent thermal properties, although its resistance to high temperatures is slightly less than a fabric that contains an equivalent amount of aluminum silicate ceramic fiber.

EXAMPLE 4

*Wire-reinforced cloth*

The cloth described in Example 1 retains its form at temperatures above 2000° F. However, inasmuch as the fibers are bound together by twist and fiber to fiber cohesion, tensile strength is not substantial at high temperatures. Higher tensile strengths can be provided by inserted material such as alloy wire. Under some conditions, a glass filament yarn or asbestos yarn insert provides adequate strength, but where the temperature limitations on these are exceeded, wire is necessary.

A herringbone weave cloth can be prepared in the manner described in Example 2, with a stainless steel wire insert. Before this cloth is heat-treated to modify its content of acrylic fiber, the cloth retains approximately 50% of its original strength after exposure to 1500° F. in an oven for 24 hours, although its abrasion resistance is low. When a nickel-chrome alloy wire is inserted in the cloth, it retains about 50% of its original strength after 24 hours at 2000° F. After heat treatment of the cloth in the manner described in Example 2, the cloth has substantially greater resistance to high temperatures and improved abrasion resistance.

When first subjected to extremely high temperatures, the cloth (not heat-treated) turns dark and smokes, and burns moderately for a short time if exposed openly to air. The heat-treated cloth is non-flammable.

Even with inserted wire, some shrinkage occurs when the cloth is heat treated. Primarily, shrinkage is manifested as a loss in thickness on the order of 3% to 5%. There is also a slight loss in weight.

EXAMPLE 5

*Coated Cloth*

The cloths of Examples 1 and 2 can be rendered better adapted for some purposes by coating the cloth with certain heat-resistant coating compounds. For example, silicone elastomers, such as those that have linear chains of the type

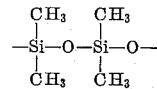

and number-average molecular weights of around one million and higher, have good temperature resistance.

Coatings of this type are useful in heat barrier applications, for example, since they block the penetration of fumes and serve to reflect heat. Coated cloth can be exposed to flame and heat up to 1800° F. to 2000° F. for limited periods of time. The potential of such coated fabric in the field of heat and flame barriers is unique.

As to the broader aspects of the invention, the inorganic, heat resistant fiber is preferably an aluminum silicate ceramic fiber, because this fiber exhibits superior refractory properties. Other ceramic fibers that can be used are sodium-calcium silicates, calcium aluminates, calcium silicates, sodium silicates, and glass. Natural and reconstituted mineral fibers are also satisfactory, such as, for example, asbestos and mineral wool. Quartz and pure silica fibers can also be used. In general, the inorganic fibers may be characterized as siliceous. All of the fibers just described contain substantial amounts of silica. Any "shot" or non-fibrous matter that is associated with the inorganic fiber is preferably removed when the inorganic fiber is carded.

The acrylic fibrous material can be any such material that is composed of an acrylonitrile polymer, including, as one example thereof, an acrylonitrile copolymer that contains at least about 85% by weight of acrylonitrile and up to about 15% by weight of a monoethylenically unsaturated monomer, such as, for example, vinyl chloride and vinyl pyridine. Copolymers that contain less than 85% acrylonitrile can also be rendered fireproof by this heat treatment, provided that the melting or sticking, i.e. softening, point of the copolymer is above about 320° F.–329° F. (160° C.–165° C.). Since it is essential to the heat treatment that oxygen be accessible to the acrylic fiber to promote and/or take part in the reaction that occurs, fibers that retain their fibrous physical form above the reaction temperature will remain accessible to the atmosphere and can be heat treated successfully, whereas those fibers that melt do not react readily after melting because of their physical form. Acrylic fibers that contain minor amounts of fillers or modifiers, such as bentonite, are also useful.

The acrylic fiber preferably forms 15% to 20% of the blend of fibers, but may be more or less, within the general range from about 10% by weight to about 85% by weight.

Binders such as aqueous dispersions of colloidal silica can be used by spraying the fibers before carding.

In heat treating webs and cloths made from the blended fibers, careful control over the time of treatment, temperature, and atmosphere are necessary. The time of treatment ordinarily depends upon the uniformity with which the cloth is heated, the rate of air circulation, and the accessibility of the fiber to the air. Under the conditions described in Example 2, heat treating times of about 3 hours have been required. In a 54" long, open air, radiant heat oven, typical throughput speeds are 2.7 yds./hr. at 560° F. to 580° F., for a 30 minute cycle, or 0.4 yd./hr. at 430° F. to 450° F., for a 3 hour cycle. The higher treating speeds are possible, in general, where close temperature control is coupled with good air circulation, for products that have a high content of ceramic fiber, and that contain acrylic fibers consisting essentially of polyacrylonitrile. In general, the temperature of the cloth should be substantially uniform in a direction transverse to its direction of movement. The rate at which the fibrous product is heated should be gradual in order to avoid conflagration when the exothermic reaction begins.

The heat treatment apparently causes an exothermic oxidation reaction, whose reaction rate is affected by those factors that would affect the rate of any reaction. Thus, higher temperatures cause the reaction to be completed more rapidly than lower temperatures, in general, where combustion is avoided. The reaction, therefore, is quite slow at temperatures in the range just above the critical temperature of about 320° F. (160° C.). At temperatures in the range 400° F. to 600° F., the reaction proceeds at more practical speeds. At more elevated temperatures, combustion may occur. In general, temperatures of about 570° F. are satisfactory for rapid processing. When insufficiently high temperatures are used, or where the reaction is not completed, the fibrous product will be flammable, and hence, subject to unpredictable loss in strength, as well as restricted in utility. When the product is overtreated, at temperatures, for example, where combustion ocurs, even on a localized scale, a charred and weakened product is obtained. The presence of the ceramic fiber exerts an important influence in distributing heat uniformly and in retarding combustion.

The atmosphere in which the reaction takes place must be an oxidizing atmosphere. A small amount of chlorine in the atmosphere accelerates the reaction but may have an adverse effect on the strength characteristics of the treated fiber. Air is preferred to pure oxygen or oxygen fortified air, for economy and because there is less danger of conflagration. Circulation of the atmosphere can be accomplished by a forced draft, or simply by natural convection currents, which will create and maintain a movement of air upwardly around and through the heated fibrous product.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

What is claimed is:

1. A heat treating process for rendering substantially fireproof a fibrous product comprising an intimate fiber blend consisting essentially of staple, inorganic, siliceous ceramic fibers, and staple, acrylic carrier fibers having a softening point above about 320° F., said process comprising subjecting said product to non-combustive heat treatment in an oxidizing atmosphere at a temperature above said softening point for a period of time sufficient to convert said carrier fibers to substantially non-flammable, heat-resistant form.

2. A heat treating process for rendering substantially fireproof a fibrous product comprising an intimate fiber blend consisting essentially of staple, inorganic, siliceous ceramic fibers, and staple, acrylic carrier fibers having a softening point above about 320° F., said ceramic fibers comprising from about 15% to about 90% by weight of said blend, said process comprising subjecting said product to non-combustive heat treatment in an oxidizing atmosphere at a temperature in the range from about 400° F. to about 600° F. for a period of time sufficient to convert said carrier fibers to substantially non-flammable, heat-resistant form.

3. A heat treating process for rendering substantially fireproof a fibrous product comprising an intimate fiber blend consisting essentially of staple, inorganic, siliceous ceramic fibers containing a major proportion of aluminum silicate, and staple, acrylic carrier fibers comprising a major proportion of polyacrylonitrile and having a softening point above about 320° F., said ceramic fibers comprising from about 15% to about 85% by weight of said blend, said process comprising subjecting said product to a non-combustive heat treatment in an oxidizing atmosphere at a temperature in the range from about 400° F. to about 600° F. for a period of time in the range from about 30 minutes to about 3 hours and sufficient to convert said carrier fibers to substantially non-flammable, heat resistant form.

4. A heat treating process for rendering substantially fireproof a fibrous product comprising an intimate fiber blend consisting essentially of staple, inorganic, siliceous ceramic fibers containing a major proportion of aluminum silicate, and staple, acrylic carrier fibers containing at least about 85% by weight of polyacrylonitrile and up to about 15% by weight of a monoethylenically unsaturated monomer and having a softening point above about 320° F., said ceramic fibers comprising from about 80% to about 85% by weight of said blend, said process comprising subjecting said product to a non-combustive heat treatment in circulating air at a substantially uniform temperature in the range from about 430° F. to about 580° F. for a period of time in the range from about 30 minutes to about 3 hours and sufficient to convert said carrier fibers to substantially non-flammable, heat resistant form.

5. A heat treating process for rendering substantially fireproof a fabric woven from yarn comprising an intimate fiber blend consisting essentially of staple inorganic, siliceous ceramic fibers containing a major proportion of aluminum silicate, and staple, acrylic carrier fibers containing at least about 85% by weight of polyacrylonitrile and up to about 15% by weight of a monoethylenically unsaturated monomer and having a softening point above about 320° F., said ceramic fibers comprising about 80% by weight of said blend, said process comprising subjecting said fabric to a non-combustive heat treatment in circulating air at a substantially uniform temperature in the range from about 482° F. to about 484° F. for a period of about 3 hours and sufficient to convert said carrier fibers into substantially non-flammable, heat resistant form, and said process resulting in a substantially fireproof fabric having after said heat treatment a shrinkage representing a total loss in area of only about 3%.

References Cited by the Examiner
UNITED STATES PATENTS 2,799,915   7/1957   Barnett et al.
2,913,802   11/1959  Barnett.
3,027,222   3/1962   Wilkinson.
3,125,404   3/1964   Crawley.

OTHER REFERENCES

Houtz: Textile Research Journal, November 1950, pp. 797 and 798.

NORMAN G. TORCHIN, *Primary Examiner.*